2 Sheets—Sheet 1.
D. WILCOX.
DIES FOR MAKING STAY-ENDS AND OFF-SETS FOR CARRIAGES.
No. 171,457. Patented Dec. 21, 1875.
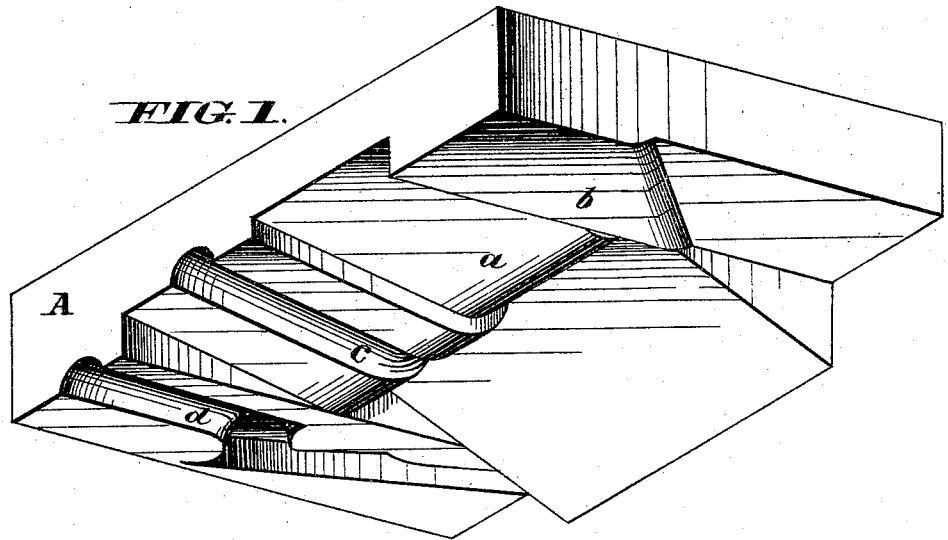
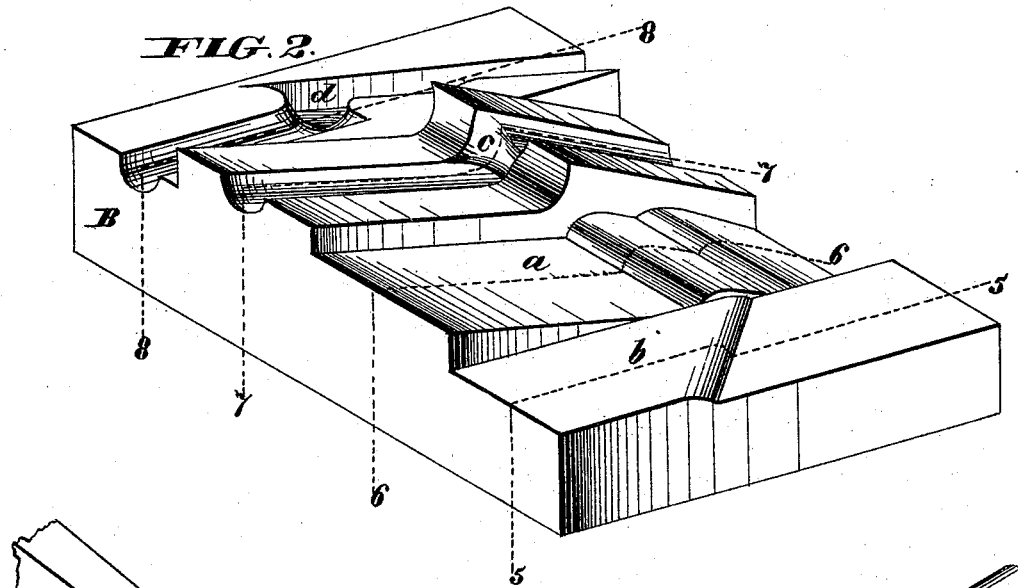
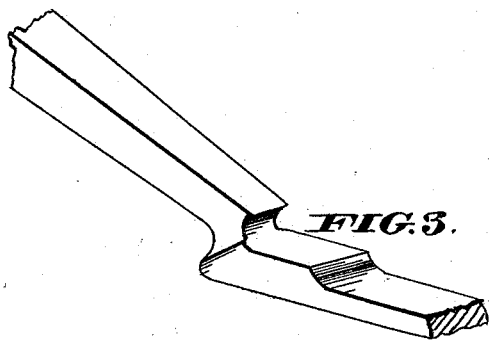
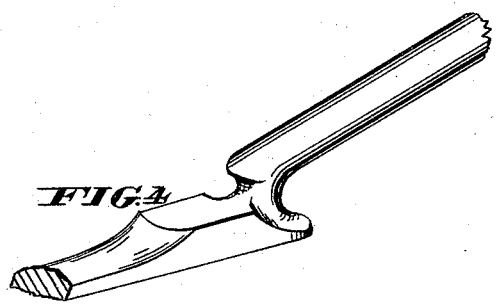
WITNESSES
Chas. J. Gooch
LeBlond. Burdett
INVENTOR
Darius Wilcox
By Knight Bro. Attorneys
N. PETERS, PHOTO-LITHOGRAPHER, WASHINGTON, D. C.

D. WILCOX.
DIES FOR MAKING STAY-ENDS AND OFF-SETS FOR CARRIAGES.

No. 171,457. Patented Dec. 21, 1875.

UNITED STATES PATENT OFFICE.

DARIUS WILCOX, OF BIRMINGHAM, CONNECTICUT, ASSIGNOR OF ONE-HALF HIS RIGHT TO ISAAC P. HOWE, OF SAME PLACE.

IMPROVEMENT IN DIES FOR MAKING STAY-ENDS AND OFFSETS FOR CARRIAGES.

Specification forming part of Letters Patent No. 171,457, dated December 21, 1875; application filed December 1, 1875.

*To all whom it may concern:*

Be it known that I, DARIUS WILCOX, of Birmingham, in the county of New Haven and State of Connecticut, have invented certain new and useful Improvements in the Manufacture of Stay-Ends and Offsets for Carriages, of which the following is a specification:

My invention relates to the swaging of stay-ends for the running-gear of carriages, said stay-ends being adapted for welding to the stay-rods, and constituting the forward ends of the stays, by which they are attached to the perch.

The invention is applicable also to the formation of the pieces of somewhat analogous shape, forming offsets, by which the supplemental stays are connected to the main stays.

The improvements consist, first, in the combination of two pairs of dies, (connected or otherwise,) adapted, by striking the blank sidewise and edgewise alternately, to reduce it approximately to the desired shape, as hereinafter described; second, in the combination of two pairs of dies, (connected or otherwise,) adapted to strike the partially-formed blank sidewise and edgewise, respectively, and complete the forming process.

Figure 5:
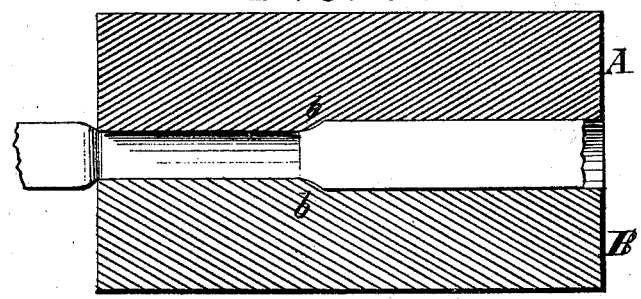
Figure 6:
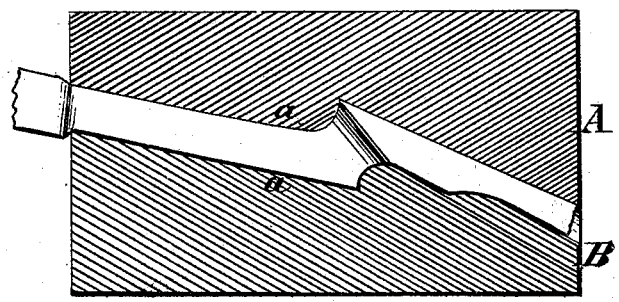
Figure 7:
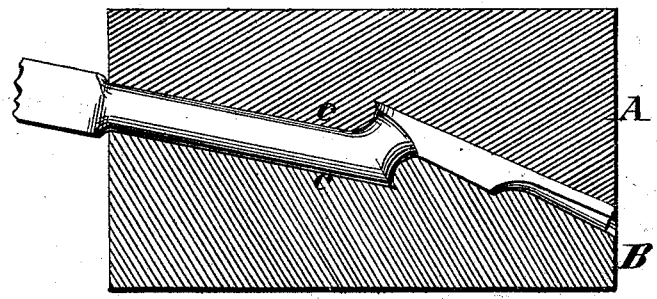
Figure 8:
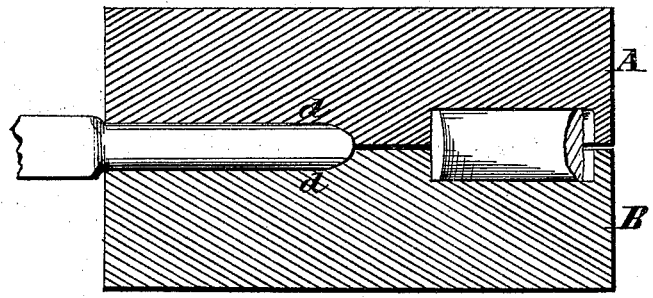

In the accompanying drawings, Figures 1 and 2 are perspective views of the respective members of a connected set of compound dies, illustrating both parts of the invention. Fig. 3 is a perspective view of a partially-formed stay-end blank. Fig. 4 is a perspective view of a stay-end completely formed. Fig. 5 is a vertical section of the dies on the line 5 5, Fig. 2. Fig. 6 is a vertical section on the line 6 6, Fig. 2. Fig. 7 is a vertical section on the line 7 7, Fig. 2. Fig. 8 is a vertical section on the line 8 8, Fig. 2.

In the sectional views, Figs. 5 to 8, inclusive, the blanks or stay-ends are shown within the dies.

A and B represent the two parts of a pair of dies, which contain connected matrices, adapted to perform the preliminary and final shaping of the stay-end blanks, in the manner hereinafter described.

Matrices formed by the parts $a\ a$ are adapted to impart the preliminary shape to the blanks by pressure in one direction flatwise of the said blank. The matrices formed by the parts $b\ b$ are adapted to strike or swage the blank in the other direction or edgewise at right angles to the first.

$c\ c$ and $d\ d$ represent more complete matrices, in which the blanks which have been partially or approximately formed by swaging in the matrices $a\ a$ and $b\ b$, alternately, are reduced to their final shape by alternately striking them flatwise in the impressions $c$, and edgewise in the impressions $d$.

The operation of my invention is as follows: To approximately form the blank the bar is passed between the impressions $a$ and $b$, back and forth, until it is reduced to a size as small as the dies will make it. The blanks are then ready to go through to the impression $c$ or $d$, or both alternately, if found desirable.

In carrying out my invention it is not essential that all the impressions shall be formed in one pair of dies, as here shown.

If preferred, the impressions $a\ a\ b\ b$ may constitute one pair of dies, $c\ c$ one die, and $d\ d$ one die.

The shape of the impressions may be varied to suit the dies, or to adapt them to any form of stay-ends or offsets desirable to be produced therein.

It will also be manifest that the stay-end may, if preferred, be made by the use of the preliminary dies $a\ a\ b\ b$ only, the forward extremity of the stay-end receiving its required oval shape in separate dies.

Having thus described my invention, the following is what I claim as new, and desire to secure by Letters Patent:

1. The combination of the dies $a\ a\ b\ b$, for the formation of stay-ends or offsets by swaging and striking edgewise and flatwise alternately, substantially as explained.

2. The combination of the preliminary swaging-dies $a\ a\ b\ b$ and the final die or dies, for completing the formation of the stay-ends or offsets, in the manner explained.

DARIUS WILCOX.

Witnesses:
CHAS. E. CLARK,
W. S. BROWNE.